(12) United States Patent
Han et al.

(10) Patent No.: US 11,157,766 B2
(45) Date of Patent: Oct. 26, 2021

(54) METHOD, APPARATUS, DEVICE AND MEDIUM FOR CALIBRATING POSE RELATIONSHIP BETWEEN VEHICLE SENSOR AND VEHICLE

(71) Applicant: Beijing Baidu Netcom Science and Technology Co., Ltd., Beijing (CN)

(72) Inventors: Chengzhi Han, Beijing (CN); Yizhi Tang, Beijing (CN); Fei Yan, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 62 days.

(21) Appl. No.: 16/708,241

(22) Filed: Dec. 9, 2019

(65) Prior Publication Data

US 2020/0394445 A1 Dec. 17, 2020

(30) Foreign Application Priority Data

Jun. 14, 2019 (CN) .......................... 201910515862.0

(51) Int. Cl.
*G06K 9/00* (2006.01)
*G06K 9/62* (2006.01)

(52) U.S. Cl.
CPC ....... *G06K 9/6212* (2013.01); *G06K 9/00791* (2013.01)

(58) Field of Classification Search
None
See application file for complete search history.

(56) References Cited

U.S. PATENT DOCUMENTS

2015/0341629 A1 11/2015 Zeng et al.
2019/0122386 A1* 4/2019 Wheeler ................ H04N 5/04
2020/0334861 A1* 10/2020 Jin ............................ G06T 7/74

FOREIGN PATENT DOCUMENTS

CN 107133988 A 9/2017
CN 108734743 A 11/2018

* cited by examiner

*Primary Examiner* — Idowu O Osifade
(74) *Attorney, Agent, or Firm* — Kilpatrick Townsend & Stockton LLP

(57) ABSTRACT

A method, apparatus, device, and medium for calibrating a pose relationship between a vehicle sensor and a vehicle are provided. The method includes: acquiring, by a field-end sensor mounted in a side edge area of the calibration environment, a first image of the calibration environment, and acquiring a second image of the calibration environment by a vehicle sensor, different identifier units being laid on a spatial plane of the calibration environment; determining a first pose transformation relationship between a vehicle coordinate system and a world coordinate system based on the first image; determining a second pose transformation relationship between a vehicle sensor coordinate system and the world coordinate system based on the second image; and calibrating the pose relationship between the vehicle sensor and the vehicle using the above determined pose transformation relationships.

17 Claims, 4 Drawing Sheets

METHOD, APPARATUS, DEVICE AND MEDIUM FOR CALIBRATING POSE RELATIONSHIP BETWEEN VEHICLE SENSOR AND VEHICLE

CROSS-REFERENCE TO RELATED APPLICATIONS

This application claims priority to Chinese Patent Application No. 201910515862.0, filed on Jun. 14, 2019, titled "Method, Apparatus, Device and Medium for Calibrating Pose Relationship between Vehicle Sensor and Vehicle," which is hereby incorporated by reference in its entirety.

TECHNICAL FIELD

Embodiments of the present disclosure relate to the field of intelligent driving technology, and particularly to a method, apparatus, device, and medium for calibrating a pose relationship between a vehicle sensor and a vehicle.

BACKGROUND

A relative pose between a vehicle camera and a vehicle body represents a rotation-translation transformation relationship of a camera coordinate system relative to a vehicle body coordinate system. During autonomous driving, it is necessary to collect environment information around the vehicle body by a camera, and transfer the information to the vehicle body coordinate system based on a pose relationship between the camera and the vehicle body, in order to achieve the purpose of controlling normal autonomous driving of a vehicle. Therefore, it is very important to calibrate poses of the camera and the vehicle body.

The conventional method for calibrating a vehicle usually will reach a preset pose relationship between the vehicle body and a calibration plate by adjusting a pose of the vehicle with the help of an external vehicle aligning device to ensure the calibration accuracy, and finally further calibrate a relative relationship between the camera and the calibration plate, thereby calibrating the relative pose between the camera and the vehicle. In addition, in the case of a large number of vehicle cameras, generally a pose relationship between pairwise cameras is calibrated, and then the pose relationship between the camera and the vehicle body is calibrated with the other sensors, such as a lidar, used as a medium.

In the above scheme, the vehicle aligning device is erected in the calibration process. Since the vehicle aligning device has a high cost, sinking transformation, which has a high engineering complexity and needs manual maintenance after finished, is required for the site, thereby resulting in very high costs of calibration using the vehicle aligning device. For calibration of vehicle-mounted multi-cameras, at present, the calibration method on the market is simple, but the achieved calibration accuracy results are only used for scenarios of low calibration accuracy requirements, such as splicing environment images photographed by multi-cameras, and assisting the drivers in observing the surrounding environment during vehicle reversing, and do not apply to scenarios of high calibration accuracy requirements, for example, guiding the vehicle in automatic parking, autonomous cruising, or the like.

SUMMARY

The embodiments of the disclose provides a method, apparatus, device and medium for calibrating a pose relationship between a vehicle sensor and a vehicle, so as to achieve high calibration accuracy and reduce the calibration cost.

In a first aspect, the embodiments of the disclosure provide a method for calibrating a pose relationship between a vehicle sensor and a vehicle, which includes:

acquiring, by a field-end sensor pre-deployed in a calibration environment, a first image of the calibration environment, and acquiring a second image of the calibration environment by a vehicle sensor, the field-end sensor being mounted in a side edge area of the calibration environment, different identifier units arranged in a preset mode being laid on a spatial plane of the calibration environment, and each identifier unit corresponding to a feature corner point;

determining a first pose transformation relationship between a vehicle coordinate system and a world coordinate system using a first feature corner point identified from the first image and a contact point between the vehicle and ground;

determining a second pose transformation relationship between a vehicle sensor coordinate system and the world coordinate system using a second feature corner point identified from the second image; and calibrating the pose relationship between the vehicle sensor and the vehicle using the first pose transformation relationship and the second pose transformation relationship.

In a second aspect, the embodiments of the disclosure further provide an apparatus for the calibrating the pose relationship between the vehicle sensor and the vehicle using the first pose transformation relationship and the second pose transformation relationship, which includes:

an image acquiring module configured to acquire, by a field-end sensor pre-deployed in a calibration environment, a first image of the calibration environment, and acquire a second image of the calibration environment by a vehicle sensor, the field-end sensor being mounted in a side edge area of the calibration environment, different identifier units arranged in a preset mode being laid on a spatial plane of the calibration environment, and each identifier unit corresponding to a feature corner point;

a first pose transformation relationship determining module configured to determine a first pose transformation relationship between a vehicle coordinate system and a world coordinate system using a first feature corner point identified from the first image and a contact point between the vehicle and ground;

a second pose transformation relationship determining module configured to determine a second pose transformation relationship between a vehicle sensor coordinate system and the world coordinate system using a second feature corner point identified from the second image; and a pose relationship calibrating module configured to calibrate the pose relationship between the vehicle sensor and the vehicle using the first pose transformation relationship and the second pose transformation relationship.

In a third aspect, the embodiments of the disclosure further provide a device, including:

one or more processors;

a storage apparatus configured to store one or more programs, wherein the one or more programs, when executed by the one or more processors, cause the one or more processors to implement the method for calibrating a pose relationship between a vehicle sensor and a vehicle according to any embodiment of the disclosure.

In a fourth aspect, the embodiments of the disclosure further provide a computer readable storage medium, storing a computer program thereon, wherein the program, when executed by a processor, implements the method for calibrating a pose relationship between a vehicle sensor and a vehicle according to any embodiment of the disclosure.

Prior to executing the calibrating the pose relationship between the vehicle sensor and the vehicle itself, the embodiments of the disclosure deploy a specialized calibration environment, mount the field-end sensor in the side edge area of the calibration environment; lay different identifier units arranged in a preset mode on a spatial plane of the calibration environment by a compact laying approach; after a to-be-calibrated vehicle is parked in the calibration environment, acquire the first image of the calibration environment including the vehicle using the field-end sensor, and acquire the second image of the calibration environment using the vehicle sensor; and finally identify related feature corner points and contact points between the vehicle and the ground from the first image and the second image, for calibrating the pose relationship between the vehicle sensor and the vehicle. Since a specialized aligning device is not required in the calibration process, and the calibration environment deployment is simple with easy post maintenance, embodiments of the present disclosure may reduce the calibration costs. Moreover, since the identifier units are fully laid on the spatial plane of the calibration environment, and enough calibration features are available in the process of calibrating the pose relationship between the vehicle sensor and the vehicle, the embodiments of the present disclosure may obtain highly accurate calibration results, and the calibration scheme of the embodiments of the present disclosure has high robustness and wide applicability.

DETAILED DESCRIPTION OF EMBODIMENTS

The present disclosure will be further described below in detail in combination with the accompanying drawings and the embodiments. It should be understood that the specific embodiments described herein are merely used for explaining the present disclosure, rather than limiting the present disclosure. In addition, it should be further noted that, for the ease of description, only the parts related to the present disclosure, instead of the whole structure, are shown in the accompanying drawings.

Embodiment I

Figure 1:
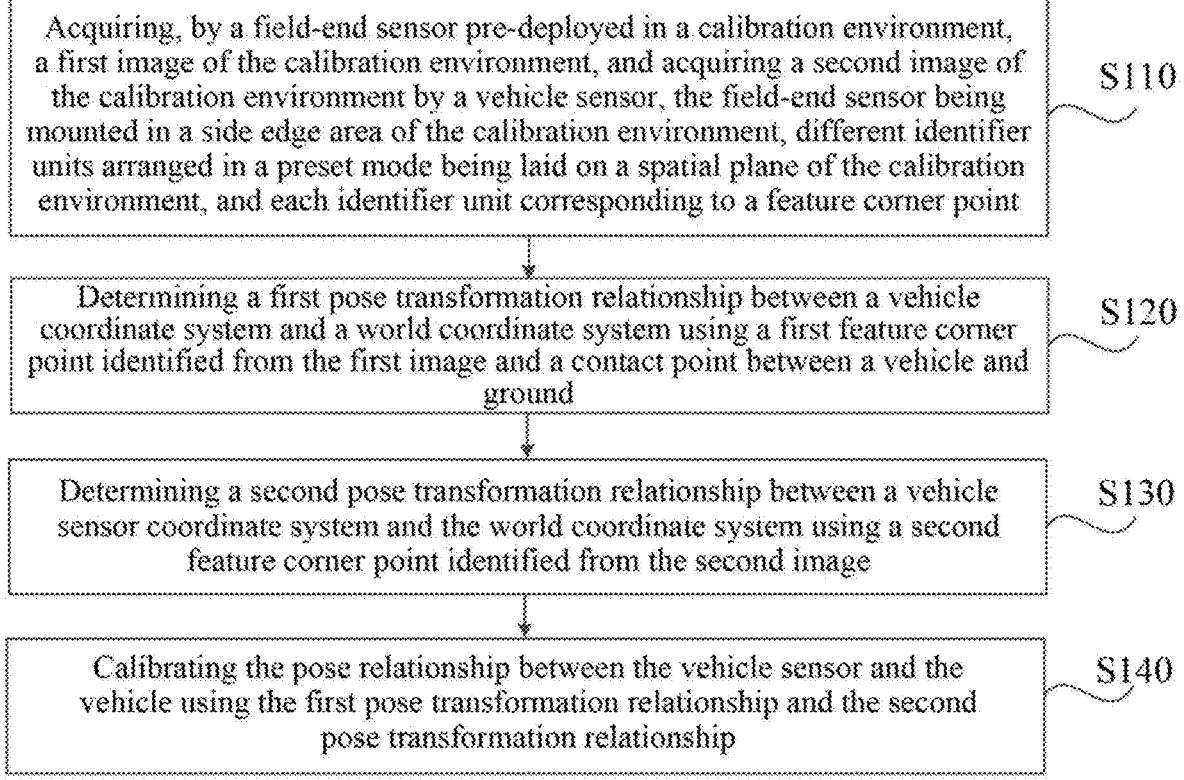
FIG. 1 is a flowchart of a method for calibrating a pose relationship between a vehicle sensor and a vehicle according to Embodiment I of the present disclosure.

FIG. 1 is a flowchart of a method for calibrating a pose relationship between a vehicle sensor and a vehicle according to Embodiment I of the present disclosure. The present embodiment is applicable to the case of calibrating the pose relationship between the vehicle sensor and the vehicle itself in a pre-deployed calibration environment. The vehicle sensor includes, but is not limited to, a front camera, a rear camera, a circular camera, and the like. The method of the present embodiment may be executed by an apparatus for calibrating a pose relationship between a vehicle sensor and a vehicle. The apparatus may be implemented by software and/or hardware, and may be integrated on any computing device, including but not limited to a vehicle-counted computing device.

As shown in FIG. 1, the method for calibrating a pose relationship between a vehicle sensor and a vehicle according to the present embodiment may include:

S110: acquiring, by a field-end sensor pre-deployed in a calibration environment, a first image of the calibration environment, and acquiring a second image of the calibration environment by a vehicle sensor, the field-end sensor being mounted in a side edge area of the calibration environment, different identifier units arranged in a preset mode being laid on a spatial plane of the calibration environment, and each identifier unit corresponding to a feature corner point.

During deployment of the calibration environment, a preset number of field-end sensors may be mounted in the side edge area, e.g., both left and right sides of a calibration area, of the calibration environment with the help of a device, e.g., a fixed support, such that the field-end sensor may be easily mounted even in an open environment, and a specific position and a shooting angle of the field-end sensor in the side edge area may change flexibly as required. An image photographed by the field-end sensor is used for computing a pose relationship between a vehicle body and the calibration environment (i.e., a pose relationship of the vehicle body in a world coordinate system). The identifier units are fully laid on each spatial plane of the calibration environment by a compact laying approach. For example, the identifier units are laid on both wall and ground of the calibration environment, to ensure that no matter what kind of pose the vehicle is parked in the calibration environment, the vehicle sensor and the field-end sensor can photograph enough available identifier units (i.e., calibration features). Enough calibration features ensure calibration results of high accuracy. Specifically, an identifier unit on the ground of the calibration environment may be used for calibrating the vehicle-mounted circular camera, and an identifier unit on the wall may be used for calibrating the vehicle-mounted front camera and the vehicle-mounted rear camera.

Identifier units laid on a given spatial plane are different from each other, and each identifier unit corresponds to a feature corner point, such that in the subsequent image identification process, a corresponding feature corner point may be determined by identifying the identifier unit. The feature corner point may be understood as an intersection of various subareas in the identifier unit. Laying mode of the identifier units on each spatial plane may be pre-designed, or any regular arrangement approach may be employed. For example, the identifier units on each spatial plane are arranged based on a regular array form, for example, a checkerboard array or circular array (equivalent to changing squares in the checkerboard to circles). A different subidentifier is provided within a subarea of any color within each identifier unit. The subidentifier may be in the form of QR codes, or patterns of other shapes, which are not specifically limited in the present embodiment. A specific position of each subidentifier within the subarea is not limited in the present embodiment, either. For example, the subidentifier may be provided at the center position of the subarea. Generally, each identifier unit may take the form of black alternating with white, subidentifiers may be provided in a white subarea or black subarea, and different subidentifiers ensure mutually different identifier units.

In addition, the size of the overall space occupied by the calibration environment, the size of each identifier unit, and the sizes of each subarea and subidentifiers within each identifier unit are not specifically limited in the present embodiment. The size of the overall space occupied by the calibration environment, the size of each identifier unit, and the sizes of each subarea and subidentifiers within each identifier unit may be reasonably designed based on specific calibration scenarios. For example, according to the experimental results, the calibration environment with the spatial length greater than or equal to 8 m, the spatial width greater than or equal to 6 m, and the spatial height greater than or equal to 2.5 m can satisfy the requirements of highly accurate calibration results in most calibration scenarios, and can achieve centimeter-level calibration accuracy.

Figure 2A:
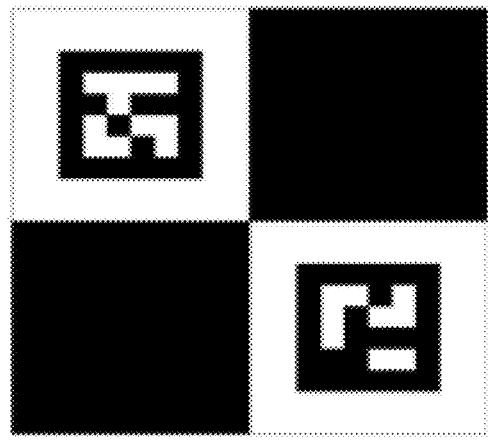
FIG. 2a is a schematic diagram of an identifier unit according to Embodiment I of the present disclosure.
Figure 2B:
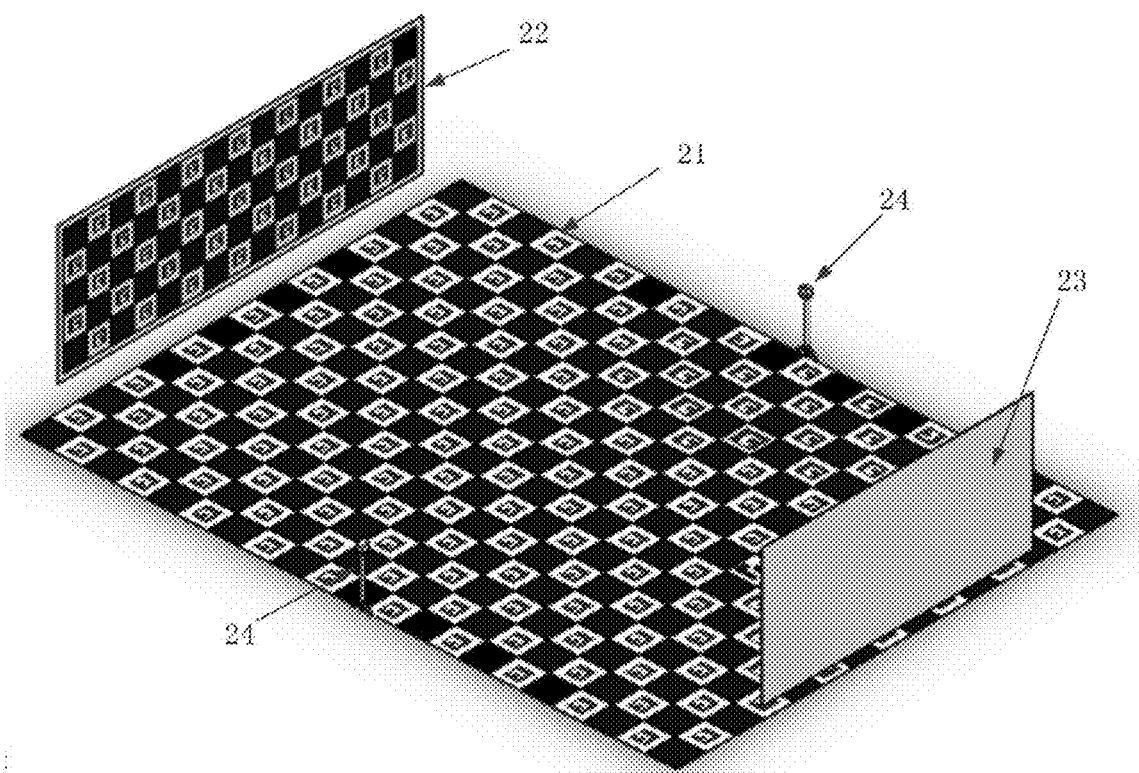
FIG. 2b is a schematic diagram of a calibration environment according to Embodiment I of the present disclosure.
Figure 2C:
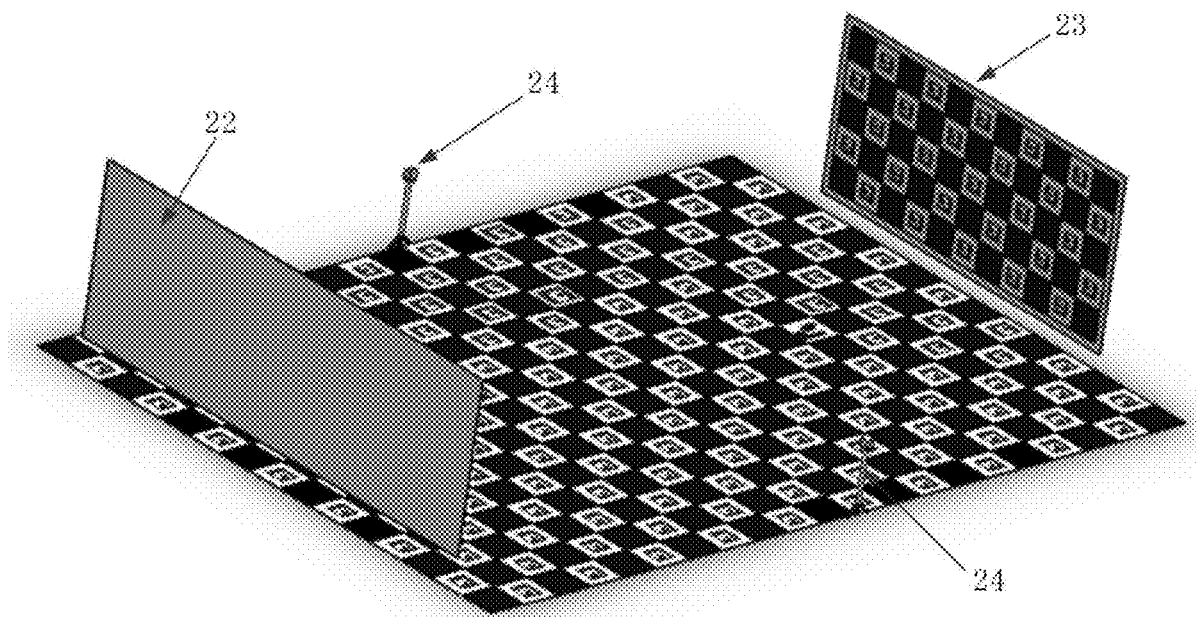
FIG. 2c is another schematic diagram of the calibration environment according to Embodiment I of the present disclosure.

As an example, FIG. 2a shows a schematic diagram of an available identifier unit, which, however, should not be construed as specifically limiting the present embodiment. As show in FIG. 2, the identifier unit includes two white subareas and two black subareas, different QR codes are provided in the two white subareas respectively, i.e., a QR code in the upper left corner and a QR in the lower right corner are in different forms, and the center area of the identifier unit is a feature corner point. As an example, FIG. 2b and FIG. 2c show a schematic diagram of the calibration environment in different viewing angles respectively. As shown in FIG. 2b and FIG. 2c, identifier units are laid on ground 21, front wall 22, and rear wall 23 in the calibration environment respectively in the form of a checkerboard array. The forms of the identifier units may be as shown in FIG. 2a, but the identifier units on a given wall or ground are different from each other (despite that current FIG. 2b and FIG. 2c cannot show differences between the identifier units). A field-end sensor 24 is mounted on the left side and right side of the calibration environment respectively using a fixed support, and the number of field-end sensors mounted on each side may be provided as required.

S120: determining a first pose transformation relationship between a vehicle coordinate system and a world coordinate system using a first feature corner point identified from the first image and a contact point between a vehicle and ground.

Specifically, the vehicle may be photographed using the field-end sensors on both sides of the calibration environment respectively, to determine the contact point between a wheel on either side of the vehicle and the ground on the first image obtained by photographing, where the contact point may refer to contact points between four wheels and the ground, or may refer to contact points between rear wheels and the ground, for example, contact points between two rear wheels and the ground. Then, position representation of the vehicle in the calibration environment is obtained in combination with the identified first feature corner point, using a transformation relationship between a field-end sensor coordinate system, a pixel coordinate system corresponding to the field-end sensor and the world coordinate system, thereby determining the first pose transformation relationship between the vehicle coordinate system and the world coordinate system. World coordinates $(X_i, Y_i, Z_i)$ of each feature corner point in the calibration environment are determined (i refers to the number of feature corner points, and may be any integer), which may be computed using a measuring device, e.g., a total station or a three-dimensional scanner, during deployment of the calibration environment, and, after completing photographing images, pixel coordinates $(u_i, v_i)$ of the feature corner point on the image may also be determined. Therefore, the feature corner point may be used as a transition point for determining the first pose transformation relationship, and a subsequent second pose transformation relationship.

S130: determining a second pose transformation relationship between a vehicle sensor coordinate system and the world coordinate system using a second feature corner point identified from the second image.

Specifically, the second pose transformation relationship between the vehicle sensor coordinate system and the world coordinate system is determined based on the second feature corner point, using a transformation relationship between the vehicle sensor coordinate system, a pixel coordinate system corresponding to the vehicle sensor, and the world coordinate system.

The process of identifying the feature center point in the present embodiment may include:

identifying identifier units on a target image, and determining pixel coordinates of each identifier unit, where the target image includes the first image or the second image; and determining a feature corner point on the target image based on the pixel coordinates of each identifier unit using a feature corner detection technology.

In the present embodiment, feature corner points on the first image and the second image may be determined using a given feature corner detection technology. The feature corner detection technology includes, but is not limited to, Harris corner detection algorithm, Shi-Tomasi corner detection algorithm, subpixel corner detection algorithm, and the like. Feature corner points obtained by the subpixel corner detection algorithm have higher identification accuracy. Common subpixel corner detection algorithms include three types: 1) an interpolation-based method, 2) a method based on geometric moment computation, and 3) a fitting-based method. Regarding pixel coordinates of the identifier units on the first image and the second image, pixel coordinates of a preset number of representative feature points on the identifier units may be selected for use as the pixel coordinates of the identifier units, to improve the identification efficiency and identification accuracy of the feature corner points. All pixel coordinates of the identifier units on the first image and the second image may alternatively be determined.

For example, as shown in FIG. 2a, in the process of identifying the feature corner point, the identifier units on the target image may be first identified to determine different subidentifiers included in each identifier unit, and then a target area between different subidentifiers in each identifier unit is used as a feature corner detection area. Based on pixel coordinates within the target area in each identifier unit on the target image, the feature corner point on the target image is determined using the feature corner detection technology. The target area belongs to an adjacent area between different subidentifiers in each identifier unit, and the specific area size may be provided based on the requirements for identifying the feature corner point.

S140: calibrating the pose relationship between the vehicle sensor and the vehicle using the first pose transformation relationship and the second pose transformation relationship.

After the pose transformation relationship between the vehicle coordinate system and the world coordinate system and the pose transformation relationship between the vehicle sensor coordinate system and the world coordinate system are determined, a pose transformation relationship between the vehicle sensor coordinate system and the vehicle coordinate system may be obtained by matrix transformation computing, thus achieving calibrating a relative pose relationship between the vehicle sensor and the vehicle itself.

Prior to executing the calibrating the pose relationship between the vehicle sensor and the vehicle itself, the technical solutions of the present embodiment deploy a specialized calibration environment, mount the field-end sensor in the side edge area of the calibration environment, lay different identifier units arranged in a preset mode on a spatial plane of the calibration environment by a compact laying approach, acquire the first image of the calibration environment including the vehicle using the field-end sensor after a to-be-calibrated vehicle is parked in the calibration environment, acquire the second image of the calibration environment using the vehicle sensor, and finally identify related feature corner points and contact points between the vehicle and the ground from the first image and the second image, for calibrating the pose relationship between the vehicle sensor and the vehicle, thus achieving the following technical effects:

1) the identifier units are compactly laid in the calibration environment, such that the calibration method of the present embodiment has very high generalization ability, can not only ensure the stability (or robustness) of automatic detection of calibration, but also provide enough calibration features to obtain highly accurate calibration results without the need for posting the calibration features on the vehicle, and can solve the problems of unexpected termination of the calibration process due to failure to identify a part of the calibration features, and low calibration accuracy caused by limited calibration features in the existing technology;

2) the field-end sensor is introduced, such that the entire calibration process has a high automation degree, and it is only necessary to park the vehicle in the calibration environment without the need for manual intervention in subsequent calibration process, thus improving the calibration efficiency and avoiding errors caused by manual operations;

3) it is easy and convenient to build the calibration environment with less workload and low costs; it is not necessary to adjust the positional relationship between the vehicle and the calibration site with the help of an additional vehicle aligning device in the calibration process; and the post maintenance costs of the calibration environment are low;

4) due to the high calibration efficiency, simple calibration operations, it is suitable for calibration on mass production lines, and low construction costs of the calibration environment, the method may also be used in calibration of after-sales maintenance of the vehicle; and 5) due to highly accurate calibration results, the method can not only achieve accurately splicing panoramic images, and achieve errors of a few pixels; but also can achieve centimeter-level positioning effect, and is used in the autonomous driving technology.

Embodiment II

Figure 3:
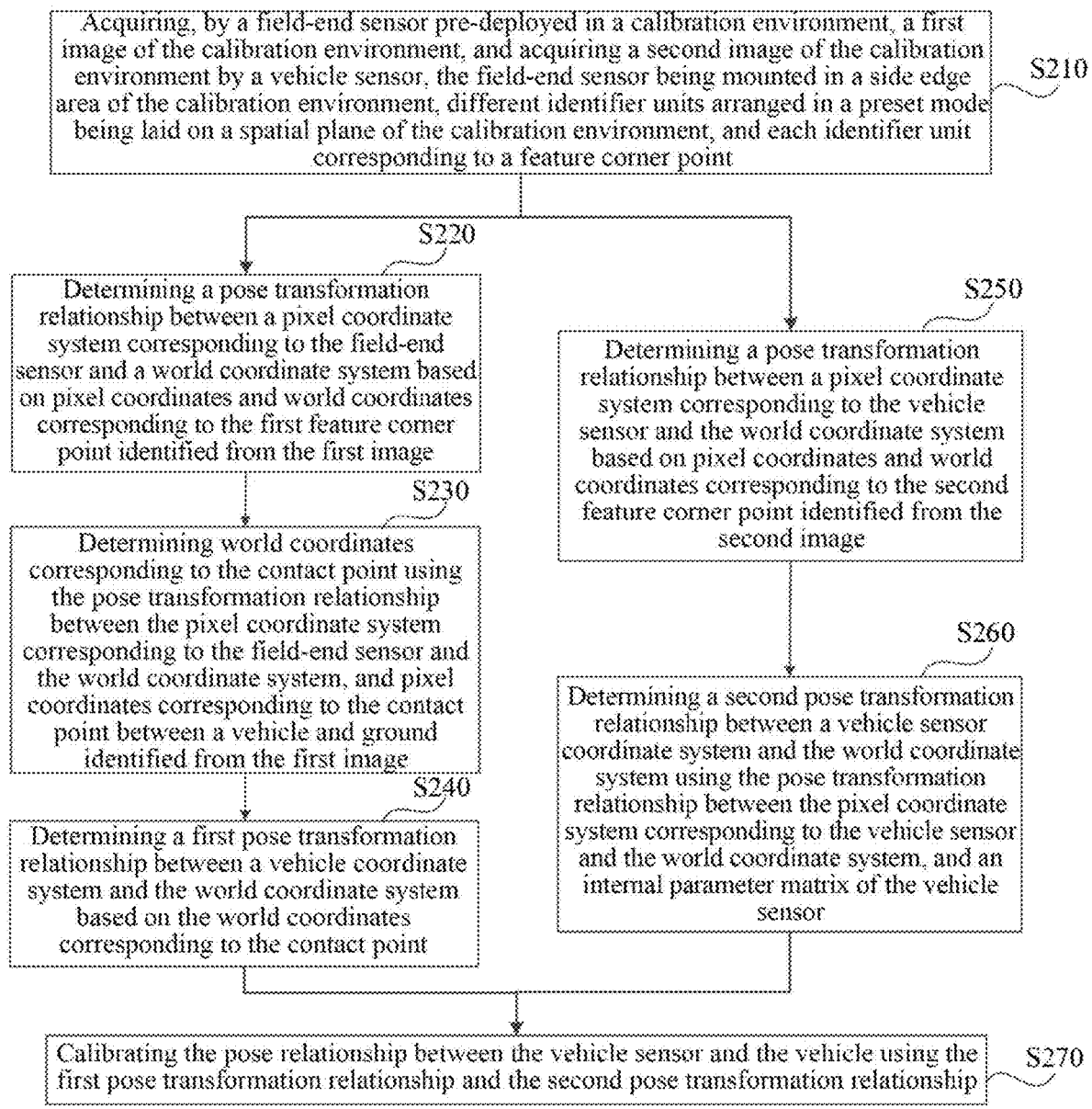
FIG. 3 is a flowchart of the method for calibrating a pose relationship between a vehicle sensor and a vehicle according to Embodiment II of the present disclosure.

FIG. 3 is a flowchart of the method for calibrating a pose relationship between a vehicle sensor and a vehicle according to Embodiment II of the present disclosure. The present embodiment is further optimized and expanded on the basis of the above embodiments. As shown in FIG. 3, the method may include:

S210: acquiring, by a field-end sensor pre-deployed in a calibration environment, a first image of the calibration environment, and acquiring a second image of the calibration environment by a vehicle sensor, the field-end sensor being mounted in a side edge area of the calibration environment, different identifier units arranged in a preset mode being laid on a spatial plane of the calibration environment, and each identifier unit corresponding to a feature corner point.

S220: determining a pose transformation relationship between a pixel coordinate system corresponding to the field-end sensor and a world coordinate system based on pixel coordinates and world coordinates corresponding to the first feature corner point identified from the first image.

Alternatively, the process of determining world coordinates corresponding to the feature corner point includes:

determining, based on an identifier unit corresponding to each feature corner point, a unique identifier of each feature corner point; and determining world coordinates corresponding to each feature corner point based on the determined unique identifier;

where information of each feature corner point and a corresponding identifier unit, and a corresponding relationship between the unique identifier and the world coordinates of each feature corner point are predetermined in a process of deploying the calibration environment.

After identifying each feature corner point, the unique identifier (e.g., a feature corner point ID) of each feature corner point may be determined based on the identifier unit corresponding to each feature corner point (the identifier unit is pre-identified before identifying the feature corner point), and then the world coordinates of each feature corner point may be determined by table lookup (i.e., querying a corresponding relationship table between unique identifiers of feature corner points and the world coordinate system). For example, as shown in FIG. 2a, after identifying the feature corner point in the figure using the feature corner detection technology, the feature corner point may be positioned based on a corresponding relationship between the feature corner point and the identifier unit shown in FIG. 2a, to determine the unique identifier of the feature corner point, and then determine the world coordinates of the feature corner point.

S230: determining world coordinates corresponding to the contact point using the pose transformation relationship between the pixel coordinate system corresponding to the field-end sensor and the world coordinate system, and pixel coordinates corresponding to the contact point between a vehicle and ground identified from the first image.

The world coordinates corresponding to the contact point can be obtained through matrix calculation by substituting the pixel coordinates corresponding to the contact point into the above determined pose transformation relationship between the pixel coordinate system and the world coordinate system.

For example, a pose transformation relationship between a pixel coordinate system (u, v) corresponding to the field-end sensor and a world coordinate system (X, Y, Z) may be expressed by the following equation:

$$\begin{bmatrix} dx \\ dy \\ dz \end{bmatrix} = R_{station\_cam2world} \cdot K^{-1} \cdot \begin{bmatrix} u \\ v \\ 1 \end{bmatrix}$$

$$X = \left(-\frac{Tz}{dz} \cdot dx\right) + Tx$$

$$Y = \left(-\frac{Tz}{dz} \cdot dy\right) + Ty$$

$$Z = 0$$

The rotation matrix $R_{station\_cam2world}$ and the displacement vector $T_{station\_cam2world}=(Tx, Ty, Tz)$ are used for representing a pose transformation relationship between a field-end sensor coordinate system and the world coordinate system, and K represents an internal parameter matrix of the field-end sensor (which may be specifically obtained by Zhang's calibration method). In the process of determining the pose transformation relationship between the pixel coordinate system corresponding to the field-end sensor and the world coordinate system using the pixel coordinates and the world coordinates corresponding to the first feature corner point, a projection error may be established based on a mapping relationship between the pixel coordinates and the world coordinates corresponding to the first feature corner point, and be minimized by optimization, thereby obtaining optimized rotation matrix $R_{station\_cam2world}$ and displacement vector $T_{station\_cam2world}$.

Based on the principle of back projection, world coordinates $(X_i, Y_i, Z_i)$ corresponding to the contact point may be determined by substituting pixel coordinates $(u_i, v_i)$ corresponding to the contact point into the above equation.

S240: determining a first pose transformation relationship between a vehicle coordinate system and the world coordinate system based on the world coordinates corresponding to the contact point.

The present embodiment characterizes a position of the vehicle in the world coordinate system using the world coordinates corresponding to the contact point, and can determine the first pose transformation relationship $H_{car2world}$ between the vehicle coordinate system and the world coordinate system based on position representation of the vehicle.

Specifically, the determining the first pose transformation relationship between the vehicle coordinate system and the world coordinate system based on the world coordinates corresponding to the contact point includes:

determining a pose deviation of the contact point between the vehicle and the ground with respect to an origin of the vehicle coordinate system; and determining the first pose transformation relationship between the vehicle coordinate system and the world coordinate system based on the pose deviation and the world coordinates corresponding to the contact point.

Generally, the origin of the vehicle coordinate system is the mass center position of the vehicle. The mass center of the vehicle may be predetermined using a mass center determining method, then a pose deviation of a contact point between a vehicle wheel and the ground with respect to the origin of the vehicle coordinate system is measured using a surveying and mapping tool, and the first pose transformation relationship between the vehicle coordinate system and the world coordinate system may be determined in combination with the world coordinates of the contact point.

S250: determining a pose transformation relationship between a pixel coordinate system corresponding to the vehicle sensor and the world coordinate system based on pixel coordinates and world coordinates corresponding to the second feature corner point identified from the second image.

S260: determining a second pose transformation relationship between a vehicle sensor coordinate system and the world coordinate system using the pose transformation relationship between the pixel coordinate system corresponding to the vehicle sensor and the world coordinate system, and an internal parameter matrix of the vehicle sensor.

The process of determining world coordinates corresponding to a feature corner point on the second image is identical to the process of determining world coordinates corresponding to a feature corner point on the first image, and the pose transformation relationship between the pixel coordinate system corresponding to the vehicle sensor and the world coordinate system may be expressed by an equation similar to the pose transformation relationship between the pixel coordinate system corresponding to the field-end sensor and the world coordinate system. A projection error is established based on a mapping relationship between the pixel coordinates and the world coordinates corresponding to the second feature corner point, and is minimized by optimization, thereby obtaining an optimized second pose transformation relationship $H_{cam2world}$ between the vehicle sensor coordinate system and the world coordinate system.

S270: calibrating the pose relationship between the vehicle sensor and the vehicle using the first pose transformation relationship and the second pose transformation relationship.

For example, a pose relationship $H_{cam2car}$ between the vehicle sensor and the vehicle may be expressed by the following equation: $H_{cam2car}=H_{world2car} \cdot H_{cam2world}$, where $H_{world2car}=H_{car2world[<]BEGINITALm(-1)}$.

Prior to executing the calibrating the pose relationship between the vehicle sensor and the vehicle itself, the technical solutions of the present embodiment deploy a specialized calibration environment, mount the field-end sensor in the side edge area of the calibration environment; lay different identifier units arranged in a preset mode on a spatial plane of the calibration environment by a compact laying approach; after a to-be-calibrated vehicle is parked in the calibration environment, acquire the first image of the calibration environment including the vehicle using the field-end sensor, and acquire the second image of the calibration environment using the vehicle sensor; and finally identify related feature corner points and contact points between the vehicle and the ground from the first image and the second image, for calibrating the pose relationship between the vehicle sensor and the vehicle. Since a specialized aligning device is not required in the calibration process, and the calibration environment deployment is simple with easy post maintenance, embodiments of the present disclosure may reduce the calibration costs. Moreover, since the identifier units are fully laid on the spatial plane of the calibration environment, and enough calibration features are available in the process of calibrating the pose relationship between the vehicle sensor and the vehicle, the embodiments of the present disclosure may obtain highly accurate calibration results, and the calibration scheme of the embodiments of the present disclosure has high robustness and wide applicability.

Embodiment III

Figure 4:
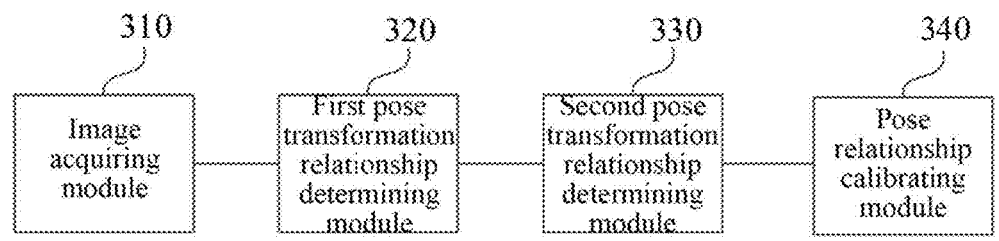
FIG. 4 is a schematic structural diagram of an apparatus for calibrating a pose relationship between a vehicle sensor and a vehicle according to Embodiment III of the present disclosure.

FIG. 4 is a schematic structural diagram of an apparatus for calibrating a pose relationship between a vehicle sensor and a vehicle according to Embodiment III of the present disclosure. The present embodiment is applicable to the case of calibrating the pose relationship between the vehicle sensor and the vehicle itself in a pre-deployed calibration environment. The vehicle sensor includes, but is not limited to, a front camera, a rear camera, a circular camera, and the like. The apparatus may be implemented by software and/or hardware, and may be integrated on any computing device, e.g., a vehicle-counted computing device.

As show in FIG. 4, the apparatus for calibrating a pose relationship between a vehicle sensor and a vehicle according to the present embodiment may include an image acquiring module 310, a first pose transformation relationship determining module 320, a second pose transformation relationship determining module 330, and a pose relationship calibrating module 340.

The image acquiring module 310 is configured to acquire, by a field-end sensor pre-deployed in a calibration environment, a first image of the calibration environment, and acquire a second image of the calibration environment by a vehicle sensor, the field-end sensor being mounted in a side edge area of the calibration environment, different identifier units arranged in a preset mode being laid on a spatial plane of the calibration environment, and each identifier unit corresponding to a feature corner point;

the first pose transformation relationship determining module 320 is configured to determine a first pose transformation relationship between a vehicle coordinate system and a world coordinate system using a first feature corner point identified from the first image and a contact point between the vehicle and ground;

the second pose transformation relationship determining module 330 is configured to determine a second pose transformation relationship between a vehicle sensor coordinate system and the world coordinate system using a second feature corner point identified from the second image; and the pose relationship calibrating module 340 is configured to calibrate the pose relationship between the vehicle sensor and the vehicle using the first pose transformation relationship and the second pose transformation relationship.

Alternatively, identifier units on each spatial plane are arranged based on a regular array form, and a different subidentifier is provided within a subarea of any color within each identifier unit.

Alternatively, the apparatus further includes a feature corner point identifying module configured to identify a feature corner point on the first image or the second image, the feature corner point identifying module including:

an identifier unit pixel coordinates determining unit configured to identify identifier units on a target image, and determine pixel coordinates of each identifier unit, where the target image includes the first image or the second image; and a feature corner detecting unit configured to determine a feature corner point on the target image based on the pixel coordinates of each identifier unit using a feature corner detection technology.

Alternatively, the first pose transformation relationship determining module 320 includes:

a pixel coordinate system and world coordinate system pose computing unit configured to determine a pose transformation relationship between a pixel coordinate system corresponding to the field-end sensor and the world coordinate system based on pixel coordinates and world coordinates corresponding to the first feature corner point identified from the first image;

a contact point world coordinates determining unit configured to determine world coordinates corresponding to the contact point using the pose transformation relationship between the pixel coordinate system corresponding to the field-end sensor and the world coordinate system, and pixel coordinates corresponding to the contact point between the vehicle and ground identified from the first image; and a first pose transformation relationship determining unit configured to determine the first pose transformation relationship between the vehicle coordinate system and the world coordinate system based on the world coordinates corresponding to the contact point.

Alternatively, the first pose transformation relationship determining unit is specifically configured to:

determine a pose deviation of the contact point between the vehicle and the ground with respect to an origin of the vehicle coordinate system; and determine the first pose transformation relationship between the vehicle coordinate system and the world coordinate system based on the pose deviation and the world coordinates corresponding to the contact point.

Alternatively, the second pose transformation relationship determining module 330 includes:

a pixel coordinate system and world coordinate system pose computing unit configured to determine a pose transformation relationship between a pixel coordinate system corresponding to the vehicle sensor and the world coordinate system based on pixel coordinates and world coordinates corresponding to the second feature corner point identified from the second image; and a second pose transformation relationship determining unit configured to determine a second pose transformation relationship between the vehicle sensor coordinate system and the world coordinate system using the pose transformation relationship between the pixel coordinate system corresponding to the vehicle sensor and the world coordinate system, and an internal parameter matrix of the vehicle sensor.

Alternatively, the apparatus further includes a feature corner point world coordinates determining module configured to determine world coordinates corresponding to the feature corner point, the feature corner point world coordinates determining module including:

a unique identifier determining unit configured to determine, based on an identifier unit corresponding to each feature corner point, a unique identifier of each feature corner point; and a feature corner point world coordinates determining unit configured to determine world coordinates corresponding to each feature corner point based on the unique identifier;

where information of each feature corner point and a corresponding identifier unit, and a corresponding relationship between the unique identifier and the world coordinates of each feature corner point are predetermined in a process of deploying the calibration environment.

Alternatively, the vehicle sensor includes a front camera, a rear camera, and a circular camera.

The apparatus for calibrating a pose relationship between a vehicle sensor and a vehicle according to some embodiments of the present disclosure may execute the method for calibrating a pose relationship between a vehicle sensor and a vehicle according to any embodiment of the present disclosure, and has corresponding function modules for executing the method and beneficial effects. Description of the method in any embodiment of the present disclosure may be referred to for the contents that are not described in detail in the present embodiment.

Embodiment IV

Figure 5:
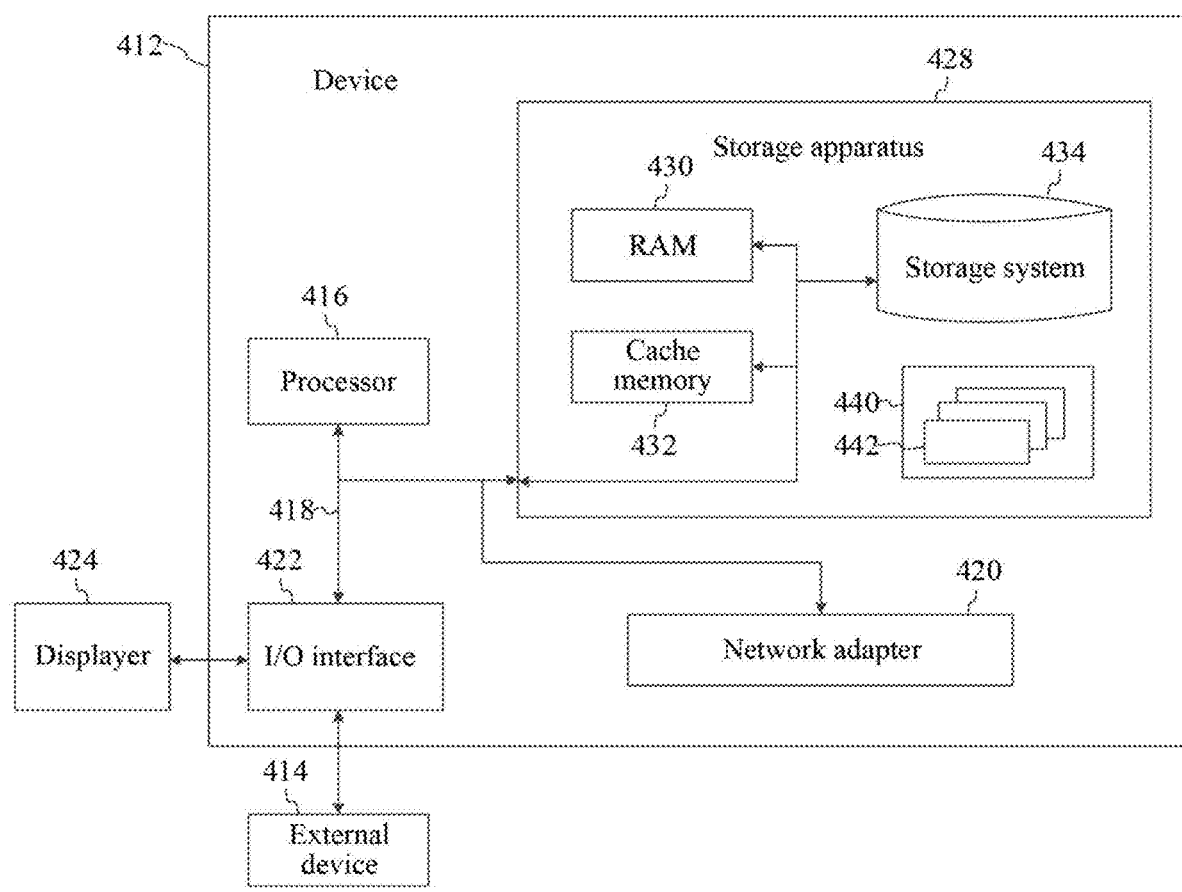
FIG. 5 is a schematic structural diagram of a device according to Embodiment IV of the present disclosure.

FIG. 5 is a schematic structural diagram of a device according to Embodiment IV of the present disclosure. FIG. 5 shows a block diagram of an example device 412 adapted to implement some embodiments of the present disclosure. The device 412 shown in FIG. 5 is merely an example, and should not limit the functions and scope of the embodiments of the present disclosure. The device 412 may be any computing device, including but not limited to a vehicle-mounted computing device.

As shown in FIG. 5, the device 412 is expressed in the form of a general-purpose device. Components of the device 412 may include, but are not limited to: a processor 416 (which may include one or more processor), a storage apparatus 428, and a bus 418 connecting different system components (including the storage apparatus 428 and the processor 416).

The bus 418 represents one or more of a few bus structures, including a storage apparatus bus or a storage apparatus controller, a peripheral bus, a graphics acceleration port, a processor, or a local bus with any bus structure of a plurality of bus structures. For example, these system architectures include, but are not limited to, an Industry Subversive Alliance (ISA) bus, a Micro Channel Architecture (MAC) bus, an Enhanced ISA bus, a Video Electronics Standards Association (VESA) local bus, and a Peripheral Component Interconnect (PCI) bus.

The device 412 typically includes a plurality of computer system readable media. These media may be any available medium that can be accessed by the device 412, including volatile media, non-volatile media, removable media and non-removable media.

The storage apparatus 428 may include a computer system readable medium in the form of a volatile memory, such as a random access memory (RAM) 430, and/or a cache memory 432. The device 412 may further include other removable/non-removable, and volatile/non-volatile computer system storage media. By way of example only, a storage system 434 may be used for reading and writing non-removable and nonvolatile magnetic media (not shown in FIG. 5, usually known as a "hard drive"). A disk drive for reading and writing a removable non-volatile disk (such as a "floppy disk") and an optical driver for reading and writing a removable non-volatile disk, such as a compact disc read-only memory (CD-ROM), a digital video disc-read only memory (DVD-ROM), or other optical media, may be provided, though the disk drive or the optical driver is not shown in FIG. 5. Under the circumstances, each drive may be connected to the bus 418 through one or more data medium interfaces. The storage apparatus 428 may include at least one program product, the program product has a set of (e.g., at least one) program modules, and the program modules are configured to execute the functions of various embodiments of the present disclosure.

A program/utility software 440 with a set of (at least one) program module 442 may be stored in, e.g., the storage apparatus 428. Such a program module 442 includes, but is not limited to, an operating system, one or more applications, other program modules, and program data. Each or a combination of these examples may include implementation of a network environment. The program module 442 generally executes the functions and/or methods in some embodiments according to the present disclosure.

The device 412 may also communicate with one or more external devices 414 (e.g., a keyboard, a pointing terminal, and a displayer 424), and may also communicate with one or more terminals that cause a user to interact with the device 412, and/or communicates with any terminal (e.g., a network card and a modem) that causes the device 412 to communicate with one or more of other computing terminals. This communication may be performed through an input/output (I/O) interface 422. Moreover, the device 412 may further communicate with one or more networks (e.g., a local area network (LAN), a wide area network (WAN) and/or a public network such as the Internet) through a network adapter 420. As shown in the FIG. 5, the network adapter 420 communicates with other modules of the device 412 through the bus 418. It should be understood that other hardware and/or software modules may be used in combination with the device 412, including but not limited to: a microcode, a device driver, a redundancy processor, an external disk drive array, a Redundant Array of Independent Disk (RAID) system, a tape drive, and a data backup storage system, though the modules are not shown in the figure.

The processor 416 executes various functional applications and data processing by running programs stored in the storage apparatus 428, such as implementing the method for calibrating a pose relationship between a vehicle sensor and a vehicle according to any embodiment of the present disclosure. The method may include:

acquiring, by a field-end sensor pre-deployed in a calibration environment, a first image of the calibration environment, and acquiring a second image of the calibration environment by a vehicle sensor, the field-end sensor being mounted in a side edge area of the calibration environment, different identifier units arranged in a preset mode being laid on a spatial plane of the calibration environment, and each identifier unit corresponding to a feature corner point;

determining a first pose transformation relationship between a vehicle coordinate system and a world coordinate system using a first feature corner point identified from the first image and a contact point between the vehicle and ground;

determining a second pose transformation relationship between a vehicle sensor coordinate system and the world coordinate system using a second feature corner point identified from the second image; and calibrating the pose relationship between the vehicle sensor and the vehicle using the first pose transformation relationship and the second pose transformation relationship.

Embodiment V

Embodiment V of the present disclosure further provides a computer readable storage medium, storing a computer program thereon, where the program, when executed by a processor, implements the method for calibrating a pose relationship between a vehicle sensor and a vehicle according to any embodiment of the present disclosure. The method may include:

acquiring, by a field-end sensor pre-deployed in a calibration environment, a first image of the calibration environment, and acquiring a second image of the calibration environment by a vehicle sensor, the field-end sensor being mounted in a side edge area of the calibration environment, different identifier units arranged in a preset mode being laid on a spatial plane of the calibration environment, and each identifier unit corresponding to a feature corner point;

determining a first pose transformation relationship between a vehicle coordinate system and a world coordinate system using a first feature corner point identified from the first image and a contact point between the vehicle and ground;

determining a second pose transformation relationship between a vehicle sensor coordinate system and the world coordinate system using a second feature corner point identified from the second image; and calibrating the pose relationship between the vehicle sensor and the vehicle using the first pose transformation relationship and the second pose transformation relationship.

The computer storage medium according to the embodiments of the disclosure may use any combination of one or more computer readable medium. The computer readable medium may be a computer readable signal medium or a computer readable storage medium. The computer readable storage medium may be, for example but not limited to, an electric, magnetic, optical, electromagnetic, IR or semiconductor system, device or unit, or any combination thereof. More specific examples (non-exhaustive list) of the computer readable storage medium include: an electrical connection having one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination thereof. Herein, the computer readable storage medium may be any tangible medium containing or storing programs, which may be used by an instruction execution system, device or unit, or a combination thereof.

The computer readable signal medium may be a data signal included in the baseband or transmitted as a part of carrier wave, and carries computer readable program codes. The data signal may be transmitted in multiple forms, including but not limited to an electromagnetic signal, an optical signal or any appropriate combination thereof. The computer readable signal medium may also be any computer readable medium rather than a computer readable storage medium, and the computer readable medium may send, spread or transmit programs to be used by an instruction execution system, device or unit, or a combination thereof.

Program codes contained in the computer readable medium may be transmitted using any suitable medium, including but not limited to: wireless, wire, cable, RF, etc., or any appropriate combination thereof.

A computer program code for executing the operations according to the disclosure may be written in one or more programming languages or a combination thereof. The programming language includes an object-oriented programming language, such as Java, Smalltalk and C++, and further includes a general procedural programming language, such as "C" language or a similar programming language. The program codes may be executed entirely on a computer of a user, executed partially on a computer of a user, executed as a standalone package, executed partially on the computer of the user and partially on a remote computer, or executed entirely on the remote computer or a server. When the remote computer is involved, the remote computer may be connected to a user computer through any type of network, including a local area network (LAN) or a wide area network (WAN), or be connected to an external computer (e.g., connected through Internet provided by an Internet service provider).

It is to be noted that the foregoing embodiments are merely preferred embodiments of the present disclosure, and the technical principles used thereby. Persons skilled in the art may understand that the present disclosure is not limited to the specific embodiments described herein. Persons skilled in the art may make various obvious changes, readjustments and substitutions without departing from the protection scope of the present disclosure. Therefore, although reference is made to the present disclosure in more detail in the foregoing embodiments, the present disclosure is not merely limited to the foregoing embodiments, more additional equivalent embodiments may be further included without departing from the conception of the present disclosure. The scope of the present disclosure is determined by the scope of the appended claims.

What is claimed is:

1. A method for calibrating a pose relationship between a vehicle sensor and a vehicle, the method comprising:

acquiring, by a field-end sensor pre-deployed in a calibration environment, a first image of the calibration environment, and acquiring a second image of the calibration environment by the vehicle sensor, the field-end sensor being mounted in a side edge area of the calibration environment, different identifier boards arranged in a preset mode being laid on a spatial plane of the calibration environment, and each identifier board corresponding to a feature corner point;

determining a first pose transformation relationship between a vehicle coordinate system and a world coordinate system using a first feature corner point identified from the first image and a contact point between the vehicle and ground;

determining a second pose transformation relationship between a vehicle sensor coordinate system and the world coordinate system using a second feature corner point identified from the second image; and calibrating the pose relationship between the vehicle sensor and the vehicle using the first pose transformation relationship and the second pose transformation relationship.

2. The method according to claim 1, wherein the different identifier boards on the spatial plane are arranged based on a regular array form, and a different subidentifier is provided within a subarea of any color within each identifier board.

3. The method according to claim 1, wherein a process of identifying the feature corner point comprises:

identifying the different identifier boards on a target image, and determining pixel coordinates of each identifier board, wherein the target image comprises the first image or the second image; and determining the feature corner point on the target image based on the pixel coordinates of each identifier board using a feature corner detection technology.

4. The method according to claim 1, wherein the determining the first pose transformation relationship between the vehicle coordinate system and the world coordinate system using the first feature corner point identified from the first image and the contact point between the vehicle and ground comprises:

determining a pose transformation relationship between a pixel coordinate system corresponding to the field-end sensor and the world coordinate system based on pixel coordinates and world coordinates corresponding to the first feature corner point identified from the first image;

determining world coordinates corresponding to the contact point using the pose transformation relationship between the pixel coordinate system corresponding to the field-end sensor and the world coordinate system, and pixel coordinates corresponding to the contact point; and determining the first pose transformation relationship between the vehicle coordinate system and the world coordinate system based on the world coordinates corresponding to the contact point.

5. The method according to claim 4, wherein the determining the first pose transformation relationship between the vehicle coordinate system and the world coordinate system based on the world coordinates corresponding to the contact point comprises:

determining a pose deviation of the contact point with respect to an origin of the vehicle coordinate system; and determining the first pose transformation relationship between the vehicle coordinate system and the world coordinate system based on the pose deviation and the world coordinates corresponding to the contact point.

6. The method according to claim 1, wherein the determining the second pose transformation relationship between the vehicle sensor coordinate system and the world coordinate system using the second feature corner point identified from the second image comprises:

determining a pose transformation relationship between a pixel coordinate system corresponding to the vehicle sensor and the world coordinate system based on pixel coordinates and world coordinates corresponding to the second feature corner point identified from the second image; and determining the second pose transformation relationship between the vehicle sensor coordinate system and the world coordinate system using the pose transformation relationship between the pixel coordinate system corresponding to the vehicle sensor and the world coordinate system, and an internal parameter matrix of the vehicle sensor.

7. The method according to claim 4, wherein a process of determining the world coordinates corresponding to each feature corner point comprises:

determining, based on an identifier board corresponding to each feature corner point, a unique identifier of each feature corner point;

determining the world coordinates corresponding to each feature corner point based on the unique identifier, wherein information of each feature corner point and a corresponding identifier board, and a corresponding relationship between the unique identifier and the world coordinates of each feature corner point are predetermined in a process of deploying the calibration environment.

8. The method according to claim 1, wherein the vehicle sensor comprises a front camera, a rear camera, and a circular camera.

9. An apparatus for calibrating a pose relationship between a vehicle sensor and a vehicle, the apparatus comprising:

at least one processor; and a memory storing instructions, wherein the instructions when executed by the at least one processor, cause the at least one processor to perform operations, the operations comprising:

acquiring, by a field-end sensor pre-deployed in a calibration environment, a first image of the calibration environment, and acquire a second image of the calibration environment by the vehicle sensor, the field-end sensor being mounted in a side edge area of the calibration environment, different identifier boards arranged in a preset mode being laid on a spatial plane of the calibration environment, and each identifier board corresponding to a feature corner point;

determining a first pose transformation relationship between a vehicle coordinate system and a world coordinate system using a first feature corner point identified from the first image and a contact point between the vehicle and ground;

determining a second pose transformation relationship between a vehicle sensor coordinate system and the world coordinate system using a second feature corner point identified from the second image; and calibrating the pose relationship between the vehicle sensor and the vehicle using the first pose transformation relationship and the second pose transformation relationship.

10. The apparatus according to claim 9, wherein the different identifier boards on the spatial plane are arranged based on a regular array form, and a different subidentifier is provided within a subarea of any color within each identifier board.

11. The apparatus according to claim 9, wherein a process of identifying the feature corner point comprises:

identifying the different identifier boards on a target image, and determine pixel coordinates of each identifier board, wherein the target image comprises the first image or the second image; and determining the feature corner point on the target image based on the pixel coordinates of each identifier board using a feature corner detection technology.

12. The apparatus according to claim 9, wherein the determining the first pose transformation relationship between the vehicle coordinate system and the world coordinate system using the first feature corner point identified from the first image and the contact point between the vehicle and ground comprises:

determining a pose transformation relationship between a pixel coordinate system corresponding to the field-end sensor and the world coordinate system based on pixel coordinates and world coordinates corresponding to the first feature corner point identified from the first image;

determining the world coordinates corresponding to the contact point using the pose transformation relationship between the pixel coordinate system corresponding to the field-end sensor and the world coordinate system, and pixel coordinates corresponding to the contact point; and determining the first pose transformation relationship between the vehicle coordinate system and the world coordinate system based on the world coordinates corresponding to the contact point.

13. The apparatus according to claim 12, wherein the determining the first pose transformation relationship between the vehicle coordinate system and the world coordinate system based on the world coordinates corresponding to the contact point comprises:

determining a pose deviation of the contact point with respect to an origin of the vehicle coordinate system; and determining the first pose transformation relationship between the vehicle coordinate system and the world coordinate system based on the pose deviation and the world coordinates corresponding to the contact point.

14. The apparatus according to claim 9, wherein the determining the second pose transformation relationship between the vehicle sensor coordinate system and the world coordinate system using the second feature corner point identified from the second image comprises:
  determining a pose transformation relationship between a pixel coordinate system corresponding to the vehicle sensor and the world coordinate system based on pixel coordinates and world coordinates corresponding to the second feature corner point identified from the second image; and
  determining the second pose transformation relationship between the vehicle sensor coordinate system and the world coordinate system using the pose transformation relationship between the pixel coordinate system corresponding to the vehicle sensor and the world coordinate system, and an internal parameter matrix of the vehicle sensor.

15. The apparatus according to claim 12, wherein a process of determining the world coordinates corresponding to each feature corner point comprises:
  determining, based on an identifier board corresponding to each feature corner point, a unique identifier of each feature corner point;
  determining the world coordinates corresponding to each feature corner point based on the unique identifier,
  wherein information of each feature corner point and a corresponding identifier board, and a corresponding relationship between the unique identifier and the world coordinates of each feature corner point are predetermined in a process of deploying the calibration environment.

16. The apparatus according to claim 9, wherein the vehicle sensor comprises a front camera, a rear camera, and a circular camera.

17. A non-transitory computer readable storage medium, storing a computer program thereon, wherein the computer program, when executed by a processor, causes the processor to perform operations for calibrating a pose relationship between a vehicle sensor and a vehicle, the operations comprising:
  acquiring, by a field-end sensor pre-deployed in a calibration environment, a first image of the calibration environment, and acquiring a second image of the calibration environment by the vehicle sensor, the field-end sensor being mounted in a side edge area of the calibration environment, different identifier boards arranged in a preset mode being laid on a spatial plane of the calibration environment, and each identifier board corresponding to a feature corner point;
  determining a first pose transformation relationship between a vehicle coordinate system and a world coordinate system using a first feature corner point identified from the first image and a contact point between the vehicle and ground;
  determining a second pose transformation relationship between a vehicle sensor coordinate system and the world coordinate system using a second feature corner point identified from the second image; and
  calibrating a pose relationship between the vehicle sensor and the vehicle using the first pose transformation relationship and the second pose transformation relationship.

* * * * *